United States Patent
Tsuchiya et al.

(10) Patent No.: US 12,159,051 B2
(45) Date of Patent: Dec. 3, 2024

(54) MIGRATION OF APPLICATION ON CONTAINER PLATFORM

(71) Applicant: Hitachi, Ltd., Tokyo (JP)

(72) Inventors: Akiyoshi Tsuchiya, San Jose, CA (US); Tomohiro Kawaguchi, Santa Clara, CA (US); Takanobu Suzuki, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 18/154,552

(22) Filed: Jan. 13, 2023

(65) Prior Publication Data

US 2024/0241660 A1  Jul. 18, 2024

(51) Int. Cl.
*G06F 3/06* (2006.01)

(52) U.S. Cl.
CPC .......... *G06F 3/0647* (2013.01); *G06F 3/0617* (2013.01); *G06F 3/0665* (2013.01); *G06F 3/067* (2013.01)

(58) Field of Classification Search
CPC .... G06F 3/0647; G06F 3/0617; G06F 3/0665; G06F 3/067
See application file for complete search history.

(56) References Cited

U.S. PATENT DOCUMENTS

| | | | | |
|---|---|---|---|---|
| 10,404,579 | B1* | 9/2019 | Biemueller | H04L 41/0803 |
| 10,678,576 | B1* | 6/2020 | Taylor | G06F 16/119 |
| 10,860,442 | B2 | 12/2020 | Heckel et al. | |
| 2009/0007106 | A1* | 1/2009 | Araujo, Jr. | G06F 9/45558 718/1 |
| 2014/0215459 | A1* | 7/2014 | Tsirkin | G06F 9/45558 718/1 |
| 2014/0359607 | A1* | 12/2014 | Tsirkin | G06F 9/4856 718/1 |
| 2017/0149687 | A1* | 5/2017 | Udupi | H04L 47/83 |
| 2018/0074748 | A1* | 3/2018 | Makin | G06F 9/4856 |

(Continued)

OTHER PUBLICATIONS

Awati, Rahul; Definition: Live Migration; 2023; https://www.techtarget.com/searchitoperations/definition/live-migration; TechTarget. (Year: 2023).*

(Continued)

*Primary Examiner* — Eric T Loonan
(74) *Attorney, Agent, or Firm* — Procopio, Cory, Hargreaves & Savitch LLP

(57) ABSTRACT

A method for application migrating from a first cluster to a second cluster. The method may include detecting application migration request from the first cluster to the second cluster for performing application migration; identifying first volumes associated with the first cluster that are used by the application; establishing data copying from the first volumes of a first storage device associated with the first cluster to second volumes of a second storage device associated with the second cluster; determining if a copy condition is met based on the data copying; for meeting the copy condition, stopping the application on the first cluster; flushing uncopied data from the first volumes to the second volumes; determining whether the flushing of the uncopied data is completed; and for the flushing of the uncopied data being completed, deploying the application on the second cluster.

20 Claims, 12 Drawing Sheets

(56) References Cited

U.S. PATENT DOCUMENTS

2020/0034175 A1* 1/2020 Calciu ................. G06F 9/45558
2021/0200573 A1* 7/2021 Cao .................... G06F 9/45558

OTHER PUBLICATIONS

Clark et al; Live Migration of Virtual Machines; May 2005; NDSI'05 Proceedings of the 2nd Conference on Networked Systems Design & Implementation; pp. 273-286. (Year: 2005).*
Wikipedia; Live Migration; Sep. 2023; https://en.wikipedia.org/wiki/Live_migration. (Year: 2023).*

* cited by examiner

300

| ID | Repository | Placement |
|---|---|---|
| App1 | https://abc.com/app1 | Cluster1 |
| App2 | https://abc.com/app2 | Cluster1 |
| App3 | https://xyz.com/app3 | Cluster2 |

| ID | Image URL | Volume claim | Status | Placement |
|---|---|---|---|---|
| App1 | https://abc.com/app1 | Claim1, Claim2 | Running | Server1 |
| App2 | https://abc.com/app2 | Claim3 | Terminated | Server2 |

| ID | Size | Storage ID |
|---|---|---|
| Claim1 | 10 TB | Storage1 |
| Claim2 | 10 TB | Storage1 |
| Claim3 | 10 TB | Storage3 |

| ID | Size | Claim | Storage ID | ID in storage |
|---|---|---|---|---|
| Vol1 | 10 TB | Claim1 | Storage1 | VolA |
| Vol2 | 10 TB | Claim2 | Storage1 | VolB |
| Vol3 | 10 TB | Claim3 | Storage3 | VolC |

| ID | Source | | Destination | | Status |
|---|---|---|---|---|---|
| | ID | Owner | ID | Owner | |
| 1 | VolA | Storage1 | VolD | Storage3 | COPY |
| 2 | VolB | Storage1 | VolE | Storage3 | PAIR |
| 3 | VolC | Storage2 | VolF | Storage4 | SPLIT |

| ID | Repository | Availability Requirement | Placement |
|---|---|---|---|
| App1 | https://abc.com/app1 | 99.99% | Cluster1 |
| App2 | https://abc.com/app2 | 99.9% | Cluster1 |
| App3 | https://xyz.com/app3 | 99.999% | Cluster2 |

FIG. 12

MIGRATION OF APPLICATION ON CONTAINER PLATFORM

BACKGROUND

Field

The present disclosure is generally directed to a method and a system for application migrating from a first cluster to a second cluster.

Related Art

Application mobility is becoming increasingly important for the stable and optimal operation of information technology (IT) systems. One of the key use cases is system optimization for decarbonization. The amount of renewable energy generated in data centers' facilities or flowing through a power grid varies depending on the weather at each location. Therefore, by concentrating applications in data centers with a greater amount of renewable energy, renewable energy utilization can be increased, and carbon emissions can be reduced.

Another example of use case involving application mobility is platform upgrade. When replacing hardware or upgrading system software such as operating systems, it is safe to build a new environment with new hardware or software and migrate applications to the new environment rather than an in-place upgrade. This is because the environment can be quickly restored to its original state when problems arise with the new hardware or software.

Container technology improves applications' mobility by packaging all software necessary to run the application into a single image. An application can be migrated by stopping an application on a source cluster and deploying it onto a destination cluster. However, this approach alone is insufficient for stateful applications since stateful applications require data migration to be performed in addition to application migration. Stateful applications store data in volumes managed by data storages. The data is essential to restart applications' processing on the destination cluster.

In the related art, a method is utilized to migrate stateful applications. The method involves receiving an indication for application migration from a first site to a second site, and identifying all volumes attached to the application. This is then followed by stopping containers of the application using the volumes after draining is performed, waiting for data to be flushed to the second site, and restarting a container to run on the second site attached to replica storage. However, downtime associated with such method can be extensive due to the required wait time associated with completion of data copying. This is because application can be stopped before data copying is completed and application restart on the destination cluster remains pending during data copying. Some applications having huge business and societal impacts require high availability. Extended downtime degrades application's availability, and makes it difficult for the method to be applied to such applications.

SUMMARY

Aspects of the present disclosure involve an innovative method for application migrating from a first cluster to a second cluster. The method may include detecting application migration request from the first cluster to the second cluster for performing application migration; identifying first volumes associated with the first cluster that are used by the application; establishing data copying from the first volumes of a first storage device associated with the first cluster to second volumes of a second storage device associated with the second cluster; determining if a copy condition is met based on the data copying; for meeting the copy condition, stopping the application on the first cluster; flushing uncopied data from the first volumes to the second volumes; determining whether the flushing of the uncopied data is completed; and for the flushing of the uncopied data being completed, deploying the application on the second cluster.

Aspects of the present disclosure involve an innovative non-transitory computer readable medium, storing instructions for application migrating from a first cluster to a second cluster. The instructions may include detecting application migration request from the first cluster to the second cluster for performing application migration; identifying first volumes associated with the first cluster that are used by the application; establishing data copying from the first volumes of a first storage device associated with the first cluster to second volumes of a second storage device associated with the second cluster; determining if a copy condition is met based on the data copying; for meeting the copy condition, stopping the application on the first cluster; flushing uncopied data from the first volumes to the second volumes; determining whether the flushing of the uncopied data is completed; and for the flushing of the uncopied data being completed, deploying the application on the second cluster.

Aspects of the present disclosure involve an innovative server system for application migrating from a first cluster to a second cluster. The server system may include detecting application migration request from the first cluster to the second cluster for performing application migration; identifying first volumes associated with the first cluster that are used by the application; establishing data copying from the first volumes of a first storage device associated with the first cluster to second volumes of a second storage device associated with the second cluster; determining if a copy condition is met based on the data copying; for meeting the copy condition, stopping the application on the first cluster; flushing uncopied data from the first volumes to the second volumes; determining whether the flushing of the uncopied data is completed; and for the flushing of the uncopied data being completed, deploying the application on the second cluster.

Aspects of the present disclosure involve an innovative system for application migrating from a first cluster to a second cluster. The system may include means for detecting application migration request from the first cluster to the second cluster for performing application migration; means for identifying first volumes associated with the first cluster that are used by the application; means for establishing data copying from the first volumes of a first storage device associated with the first cluster to second volumes of a second storage device associated with the second cluster; means for determining if a copy condition is met based on the data copying; for meeting the copy condition, means for stopping the application on the first cluster; means for flushing uncopied data from the first volumes to the second volumes; means for determining whether the flushing of the uncopied data is completed; and for the flushing of the uncopied data being completed, deploying the application on the second cluster.

BRIEF DESCRIPTION OF DRAWINGS

A general architecture that implements the various features of the disclosure will now be described with reference to the drawings. The drawings and the associated descriptions are provided to illustrate example implementations of the disclosure and not to limit the scope of the disclosure. Throughout the drawings, reference numbers are reused to indicate correspondence between referenced elements.

FIG. 3 illustrates an example application deployment management table managed by the application manager, in accordance with an example implementation.

FIG. 4 illustrates an example application management table managed by the container orchestrator, in accordance with an example implementation.

FIG. 5 illustrates an example volume claim management table managed by the container orchestrator, in accordance with an example implementation.

FIG. 6 illustrates an example volume management table managed by the container orchestrator, in accordance with an example implementation.

FIG. 7 illustrates an example copy management table managed by the storages, in accordance with an example implementation.

FIG. 12 illustrates an example application deployment management table of the second embodiment, in accordance with an example implementation.

DETAILED DESCRIPTION

Figure 1:
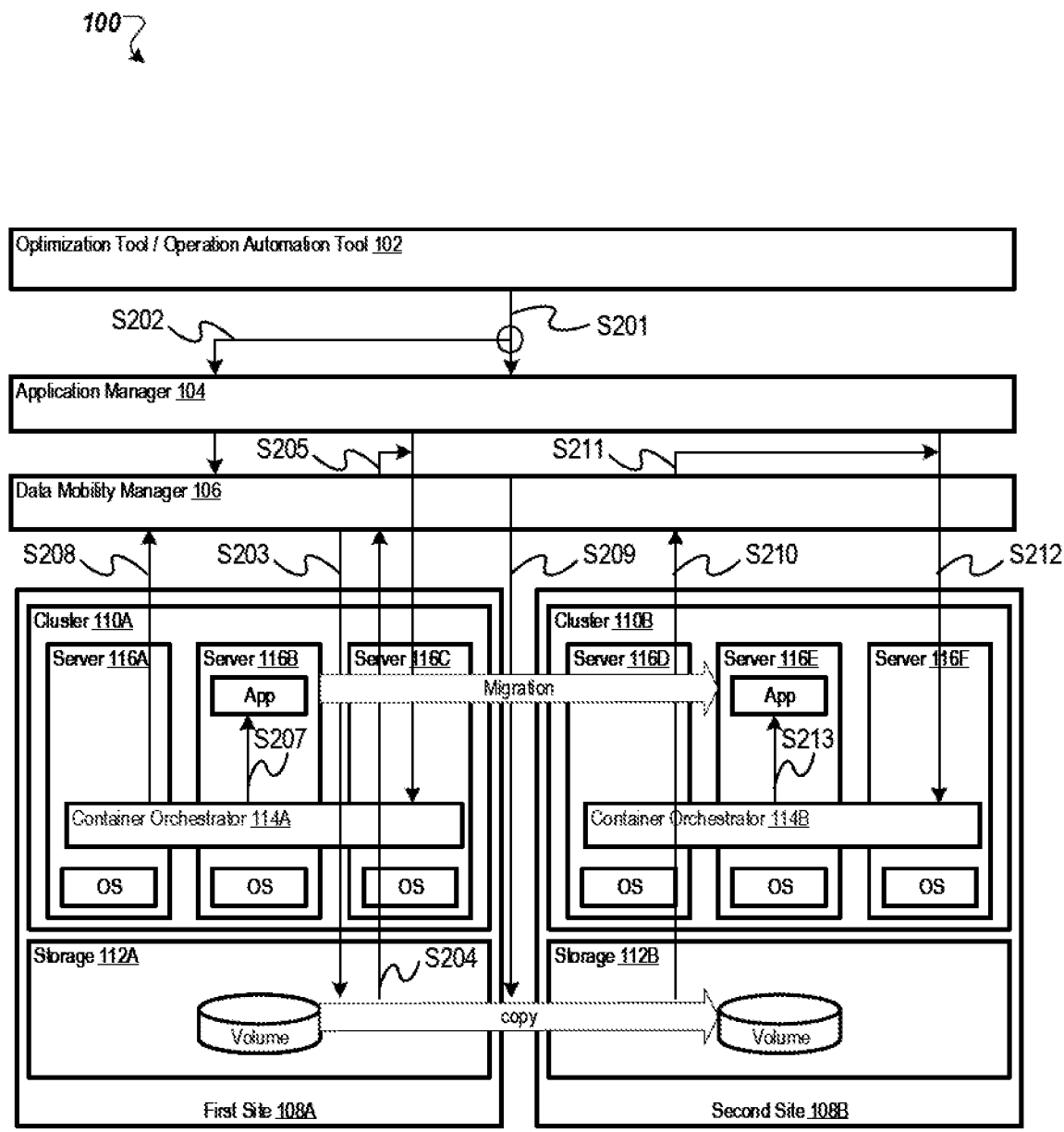
FIG. 1 illustrates an example system and example process flow for application migration optimization, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of the ordinary skills in the art practicing implementations of the present application. Selection can be conducted by a user through a user interface or other input means, or can be implemented through a desired algorithm. Example implementations as described herein can be utilized either singularly or in combination, and the functionality of the example implementations can be implemented through any means according to the desired implementations.

Present example implementations relate to methods and systems for migrating application while reducing downtime. Data copying is performed before stopping the application on the source cluster and keeps it running on the source cluster until the amount of uncopied data becomes sufficiently small.

FIG. 1 illustrates an example system and example process flow for application migration optimization, in accordance with an example implementation. The system 100 includes optimization tool/operation automation tool 102, application manager 104, data mobility manager 106, first site 108A, and second site 108B. While two sites are provided in FIG. 1, the number of sites associated with the system 100 is not limited as such and may include more than two sites.

The application manager 104 manages applications. The application manager 104 selects a cluster for deployment of the requested application based on an application migration request and initiates application deployment to a selected destination cluster. As illustrated in FIG. 1, the first site 108A has a cluster 110A and a storage/storage device 112A, and the second site 108B has a cluster 110B and a storage/storage device 112B. When the migration of the application is requested, the application manager 104 selects a new cluster for the destination based on the request, stops the application on the source cluster, and deploys it to the selected new cluster. The application manager 104 can be provided as Software as a Service (SaaS). In some example implementations, the application manager 104 is implemented as software and runs on servers associated with the first site 108A, the second site 108B, etc.

The optimization tool/operation automation tool 102 requests the application manager 104 to migrate applications. The optimization tool/operation automation tool 102 monitors system status, analyzes the status, and plans configuration change to improve system status. For example, to improve the ratio of renewable energy, the optimization tool/operation automation tool 102 provides plans to migrate applications to a site that has a large amount of renewable energy. The plans may include information such as, but not limited to, applications that are to be migrated, migration destinations, etc. The optimization tool/operation automation tool 102 can be provided as SaaS. Similar to the application manger 104, the optimization tool/operation automation tool 102 can be implemented as software and runs on servers associated with the first site 108A, the second site 108B, etc.

In some example implementations, the optimization tool/operation automation tool 102 automatically executes a system maintenance workflow. For example, as a part of the hardware workflow of hardware replacement or software update, the optimization tool/operation automation tool 102 requests the application manager 104 to migrate applications from an old environment to a new environment. In some example implementations, a user can be a requestor for application migration.

The data mobility manager 106 migrates volumes of the source storage device used by the application to be migrated when the application manager 104 migrates applications. As illustrated in FIG. 1, the storage device 112A is the source storage device that manages the volumes 114A used by the application. The data mobility manager 106 can be provided as SaaS. Another form of implementation of the data mobility manager is implemented as software. In this case, the data mobility manager tool runs on servers in site1, site2, or another site. In some example implementations, the data mobility manager 106 is implemented as software and runs on servers associated with the first site 108A, the second site 108B, etc.

The container orchestrators, such as container orchestrator 114A and container orchestrator 114B, run applications implemented with containers on a number of servers. Each application includes at least one container. The group of servers managed by one container orchestrator is described as a cluster. For example, servers 116A-C are managed by container orchestrator 114A, and form the cluster 110A. Similarly, servers 116D-F are managed by container orchestrator 114B, and form the cluster 110B. A server is not limited to a physical machine implemented by hardware, but may also be a virtual machine (VM) created on a server. It can also be a laptop or personal computer. Hereafter, these are collectively referred to as "servers".

Each cluster, such as cluster 110A and cluster 110B, is connected to corresponding storages/storage devices for storing application data. For example, storage/storage device 112A stores application data associated with cluster 110A, and storage/storage device 112B stores application data associated with cluster 110B. When deploying an application, volumes for the application are created at the destination storage device and the application data is stored in the volumes. Servers belonging to a cluster are connected to the storage/storage device via a network to access volumes of the storage/storage device. Each storage/storage device is also connected via network to allow for performance of data copying. A storage can be a dedicated device such as a RAID array device or a software-defined storage (SDS) running on servers. In some example implementations, Hyper-Converged Infrastructure (HCI) is applied such that SDS and the applications are operated on the same servers.

As illustrated in FIG. 1, when an application is requested to be migrated on the application manager 104 at S201, the data mobility manager 106 detects that the migration initiation through S202. Next, the data mobility manager 106 starts data copying for volumes used by the application from the source cluster (current location) to the destination cluster at S203. After starting the data copying, the data mobility manager 106 monitors the copy status at S204, and prevents the application manager 104 from stopping the application on the source cluster and starting the application on the destination cluster. When the copy status indicates the amount of uncopied data becomes sufficiently small, the data mobility manager 106 allows the application manager 104 to stop the application on the source cluster at S205. Once application stopping is allowed, the request by the application manager 104 to the container orchestrator on the source cluster, such as container orchestrator 114A, is accepted at S206 and the container orchestrator 114A stops the application at S207. The data mobility manager 106 confirms the application is stopped by archiving application status from the container orchestrator 114A at S208, and instructs the storage, such as storage/storage device 112A, having the volumes to flush remaining uncopied data and stop copying at S209. After that, the data mobility manager 106 confirms the copying is stopped at S210 and allows the application manager 104 to deploy the application onto the destination cluster at S211. Once deploying the application is allowed, the request by the application manager 104 to the container orchestrator on the destination cluster, such as container orchestrator 114B, is accepted at S212 and the container orchestrator 114B starts the application at S213.

Downtime is reduced by starting data copying before the application stops on the source cluster and keeping the application running on the source cluster until the amount of uncopied data is sufficiently small. In addition, by ensuring that the application is stopped in the source cluster and then flushing the data, data is replicated to the destination with application consistent data and no data loss.

Furthermore, the application is deployed on the destination cluster after confirming that the flushing of uncopied data is completed and copying has stopped, thereby preventing the application from loading data that is in the process of being copied or flushed and is not consistent.

Finally, the application manager 104 is responsible for application migration and the data mobility manager 106 is responsible for data migration. The data mobility manager 106 detects the application migration and starts to migrate volumes used by the application autonomously. This architecture allows users to use any application manager and improves the flexibility of system integration.

Figure 2:
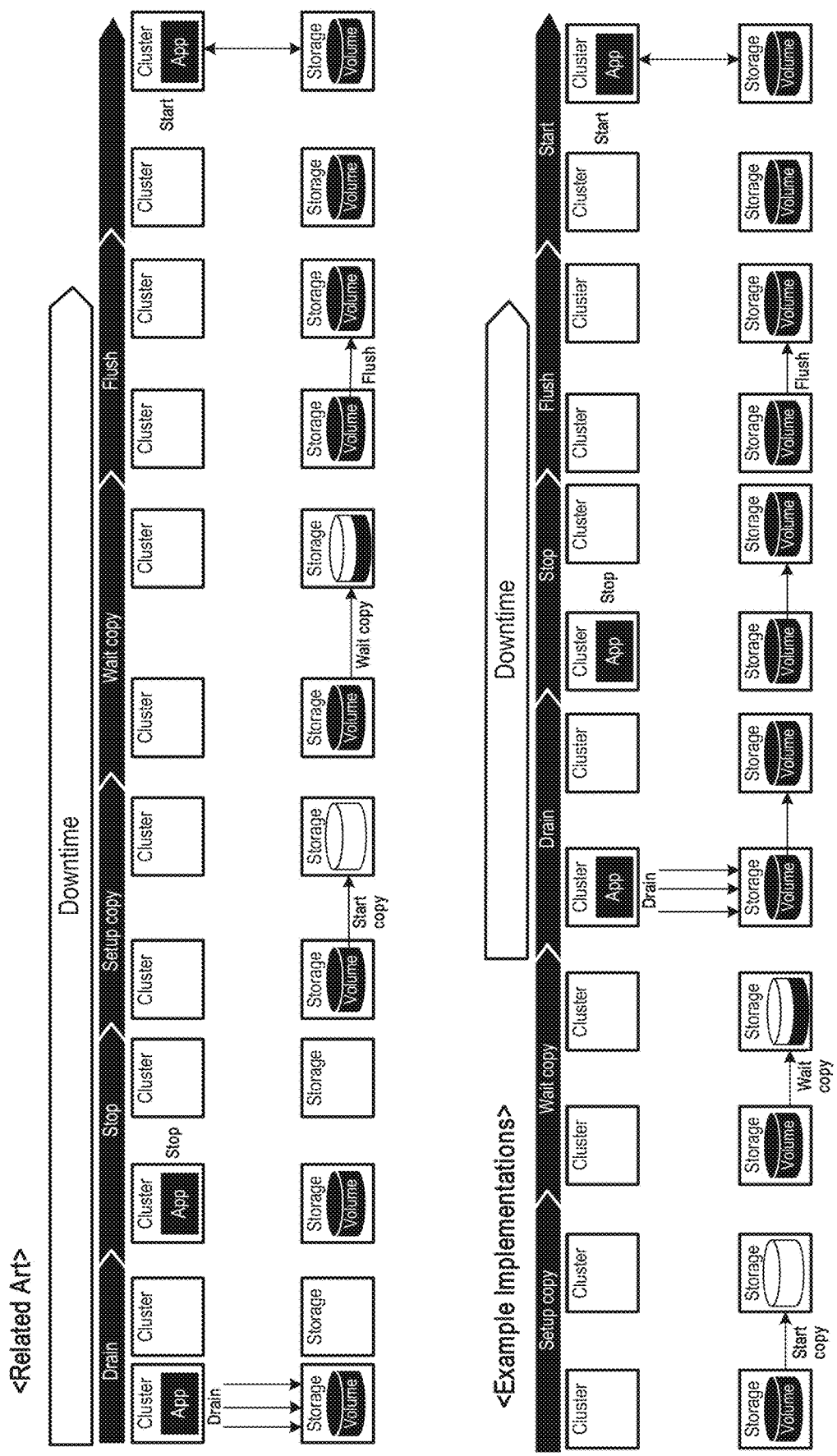
FIG. 2 illustrates comparison between related art and the process flow as illustrated in FIG. 1.

FIG. 2 illustrates comparison between related art and the process flow as illustrated in FIG. 1. As illustrated in FIG. 2, with the related art, the application on the source cluster can be stopped before copying of the source volume is started. Downtime for the related art encompasses draining the unwritten data from memory to volumes, stopping the application on the source cluster, setting up for copying, waiting for copying, and flushing uncopied data. As illustrated in FIG. 2, a signature of the downtime is associated with setting up for copying and waiting for copying.

With the example implementations, data copy is started prior to stopping the application on the source cluster and the application continues to operate until the amount of uncopied data becomes sufficiently small. Therefore, downtime associated with the example implementations derive only from draining the unwritten data from memory to volumes, flushing uncopied data, and stopping the application on the source cluster, which does not include the time needed to copy most of the application data.

FIG. 3 illustrates an example application deployment management table 300 managed by the application manager, in accordance with an example implementation. As illustrated in FIG. 3, the application deployment management table 300 includes information such as ID, repository, and placement information. Each application has a corresponding entry in the application deployment management table 300.

ID is an identifier of the application. Repository is location information of the repository that has manifest files to deploy the application. The typical form of the information is the Uniform Resource Locator (URL) of the repository. Placement is location information where the application runs. Typically, location is specified with the ID of the cluster on which the application runs. ID and repository are given by users when users request the application manager to deploy an application. The placement can be specified by users or automatically decided by the application manager.

FIG. 4 illustrates an example application management table 400 managed by the container orchestrator, in accordance with an example implementation. As illustrated in FIG. 4, the application management table 400 includes information such as ID, image URL, volume claim, status, and placement. Each application has a corresponding entry in the application management table 400.

ID is an identifier of the application. Image URL is information on the location of the container image registry where the container image of the application is stored. The typical form of the information is the URL of the repository. Volume claim is information on volumes used by the application. This refers to entries of the volume claim management table with the ID of the volume claim. If the application uses multiple volumes, then the corresponding field has multiple values. If the application uses no volume, then the field has no value.

Status is information on the application status. Information under status include information such as, but not limited to, running, terminated, waiting, etc. "Running" means that the application has been started up and running. "Terminated" means that the application has been stopped. In some example implementations, instead of having "Terminated" as status information in this field, deletion of the corresponding entry from the application management table 400 is performed to show that the application has stopped. "Waiting" means waiting for the startup of the application to complete.

Placement is information on the server where the application runs. Typically, location is specified with the ID of the server on which the application runs. ID, image URL, and volume claims are specified by users in the manifest files for application deployment. Status is decided by the container orchestrator according to the container's status. Similarly, placement is also decided by the container orchestrator when the application is deployed onto the cluster.

FIG. 5 illustrates an example volume claim management table 500 managed by the container orchestrator, in accordance with an example implementation. As illustrated in FIG. 5, the volume claim management table 500 includes information such as ID, size, and storage ID. By creating a new entry to the volume claim management table 500, volume creation is requested. Therefore, each entry of the volume claim management table 500 has a corresponding entry in the volume management table, which will be described in more details below.

ID is an identifier of the volume claim. Size is the requested size of a volume that the application requires. Storage ID is the location where the volume is to be created. A storage is specified by a storage ID. In some example implementations, specification is made by URL of an application programming interface (API) endpoint to request volume operations on the storage. Volume claims are defined by users as a part of manifest files for the application.

FIG. 6 illustrates an example volume management table 600 managed by the container orchestrator, in accordance with an example implementation. As illustrated in FIG. 6, the volume management table 600 includes information such as ID, claim, size, storage ID, and ID in storage. Each entry of the volume management table 600 has a corresponding entry in the volume claim management table 500.

ID is an identifier of the volume. Size is the requested size of a volume. Claim is a reference to the corresponding entry in the volume claim management table 500. Storage ID is information of storage that owns the volume. A storage is specified by a storage ID. In some example implementations, specification is made by URL of an API endpoint to request volume operations on the storage. ID in storage is the identifier of the volume managed by each storage. If the identifier is the same as the identifier in the container orchestrator, this field can be omitted.

FIG. 7 illustrates an example copy management table 700 managed by the storages, in accordance with an example implementation. Each copy relation has a corresponding entry in the copy management table 700. The storage having the source or destination volume has information about the copy in question. As illustrated in FIG. 7, the copy management table 700 includes information such as ID, source, destination, and status. The container orchestrator 114 may keep a copy of some or all of this information as a cache, and in this case, the data mobility manager 106 may use this cached information.

ID is an identifier of the copy relation. Source is information on a copy source volume, and destination is information on a copy destination volume. Each one has an associated ID and owner information. ID is the ID of a source or destination volume. The owner is the ID of the storage that owns the volume.

Status is copy status. Examples of statuses include, but not limited to, COPY, PAIR, SPLIT, etc. COPY means that a copy relationship has been established and an initial copy is being performed. PAIR means that the initial copy has been completed and the updated differences are being continuously synchronized. SPLIT means that copying is stopped/suspended.

Figure 8:
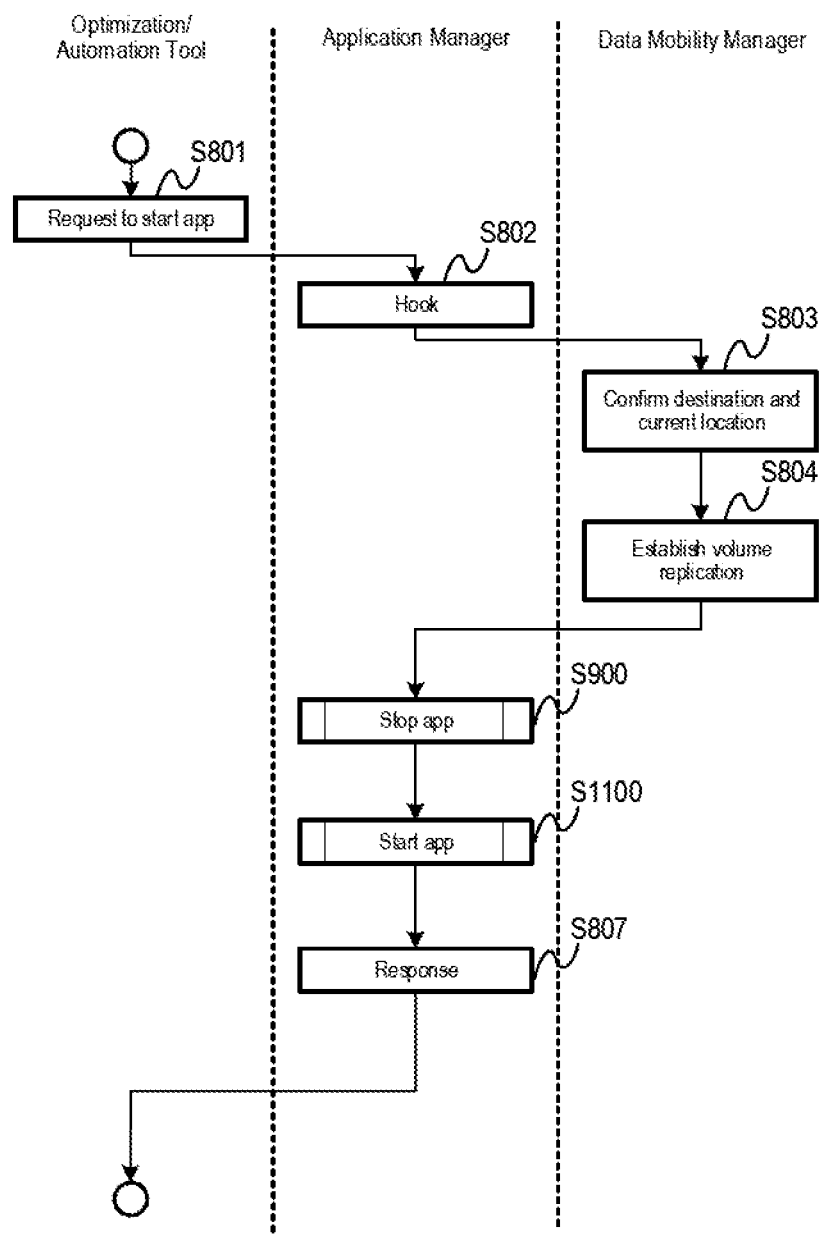
FIG. 8 illustrates an example processing flow to migrate an application, in accordance with an example implementation.

FIG. 8 illustrates an example processing flow to migrate an application, in accordance with an example implementation. First, the optimization tool, operation automation tool, or user requests the application manager to migrate an application at S801. At this step, the requestors specify a destination location by cluster ID or site ID. When the requestor specifies site ID instead of cluster ID, a cluster is automatically selected by the application manager according to the requestor's specification. In either case, the placement field of the corresponding entry to the requested application in the application deployment table would be changed to the destination cluster.

Next, the application manager receives the request, and the data mobility manager hooks the request at S802. This step can be implemented with webhook technology which allows for additional process to be added dynamically. After hooking the request, the data mobility manager confirms the migration source and destination at S803. The source cluster can be identified by checking the placement field of the corresponding entry to the requested application in the application deployment table. The migration destination cluster can be identified by checking the request. If the migration request is implemented as an update request for the corresponding entry in the application deployment management table 300, the destination cluster can be identified by checking the placement field of the new value for the entry.

Next, the data mobility manager establishes data copy relation for the volumes used by the application at S804. The volumes can be identified by referring to the volume claim field of the entry corresponding to the requested application in the application management table 400.

Next, the application manager stops the application on the source cluster at S900 and the application is started on the destination cluster at S1100. Steps S900 and S1100 can be processed in parallel and are described in details below. Lastly, the application manager returns the migration result to the requestor at S807.

Figure 9:
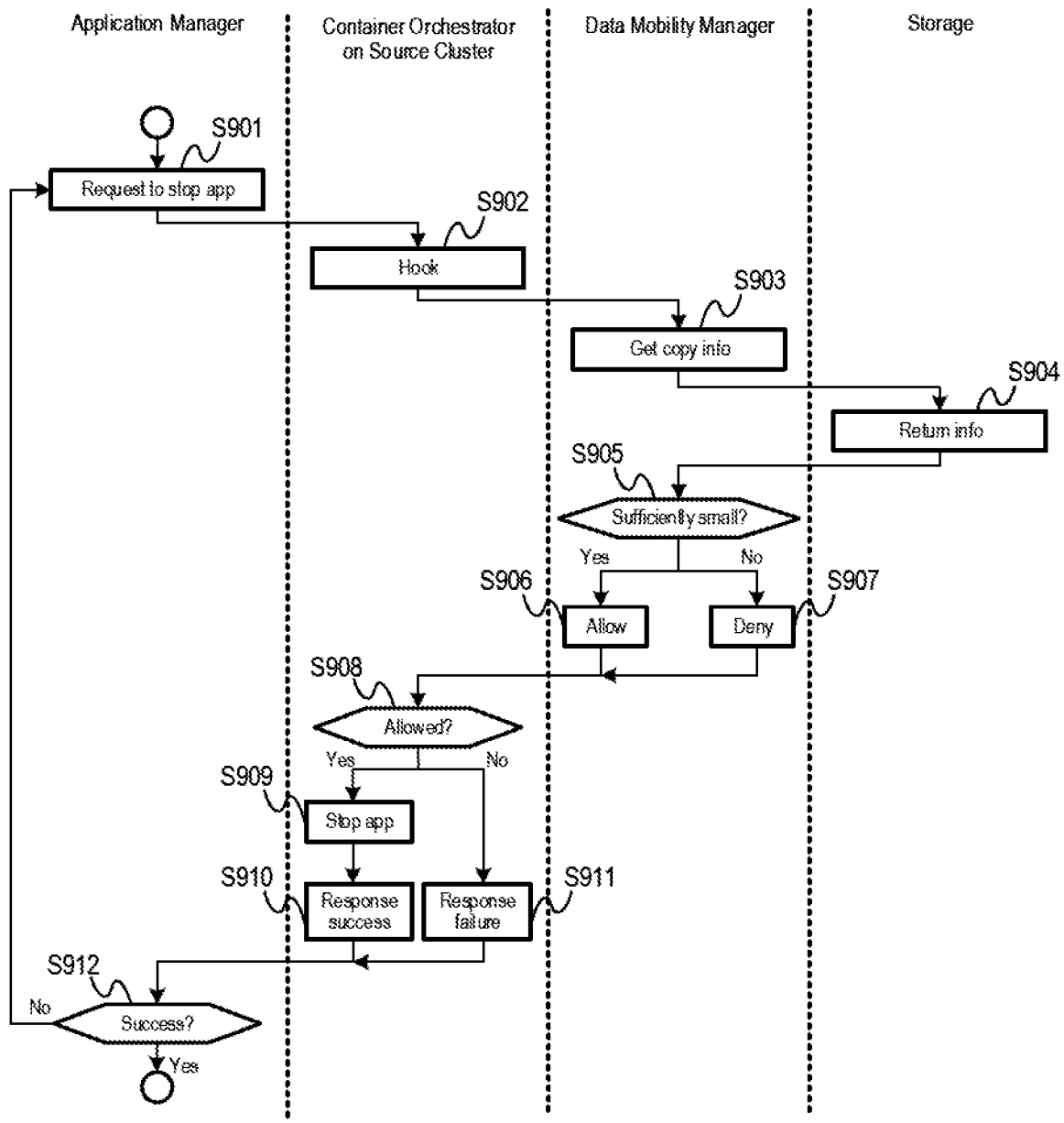
FIG. 9 illustrates an example processing flow for stopping the application on the source cluster, in accordance with an example implementation.

FIG. 9 illustrates an example processing flow for stopping the application on the source cluster, in accordance with an example implementation. First, the application manager requests the container orchestrator of the source cluster to stop the application at S901. This request can be implemented as a request to delete an entry in the application management table 400 corresponding to the application in question, or to change the status of the entry to "Terminated".

Next, when the container orchestrator receives the request, the data mobility manager hooks the request at S902. This step can be implemented with webhook technology which allows for additional process to be added dynamically.

Next, the data mobility manager gets copy information to confirm the copy status at S903. The copy status can be identified by checking the status field of the entry in the copy management table. The data mobility manager can identify the volume claim associated with the application by checking the volume claim field of the entry corresponding to the application in the application management table 400. Using the identified volume claim as key, the data mobility manager can identify the volume used by the application by searching the claim field of the volume management table. Using the storage ID and ID in storage of the identified volume as keys, the data mobility manager can identify the data copy associated with the application by searching the source and destination of the copy management table. The storage returns the requested information to the data mobility manager at S904.

At S905, the data mobility manager confirms whether the uncopied data is sufficiently small or not. In some example implementations, the confirmation is performed by checking the copy status. If the copy status is PAIR, the data mobility manager can determine that the uncopied data is sufficiently small because PAIR status means that the initial copy has been completed. In some example implementations, the confirmation is performed by checking that the amount of data remaining in the journal, which is for storing copy pending data, as data waiting to be copied is below a threshold value.

If the amount of the uncopied data is sufficiently small, the data mobility manager allows the request to stop the application at S906. On the other hand, if the amount of the uncopied data is determined to be not sufficiently small, the data mobility manager then denies the request to stop the application at S907.

At S908, the container orchestrator receives the determination if the request to stop the application is allowed or not. If the request is allowed, the container orchestrator stops the application at S909 and returns the result as successful to the application manager at S910. In the process of stopping the application, the container comprising the application writes the unwritten data cached on the server's memory to the volume and terminates the container. In addition, when the application is stopped, the container orchestrator deletes the entry corresponding to the application in question in the application management table 400 or changes the status field of the entry to "Terminated". If the request is not allowed, the data mobility manager returns the result as failure to the application manager at S911.

At S912, if the result is successful, then the process is completed. On the other hand, if failure is returned as the result, then the data mobility manager returns to S901 and retries to stop the application.

Figure 10:
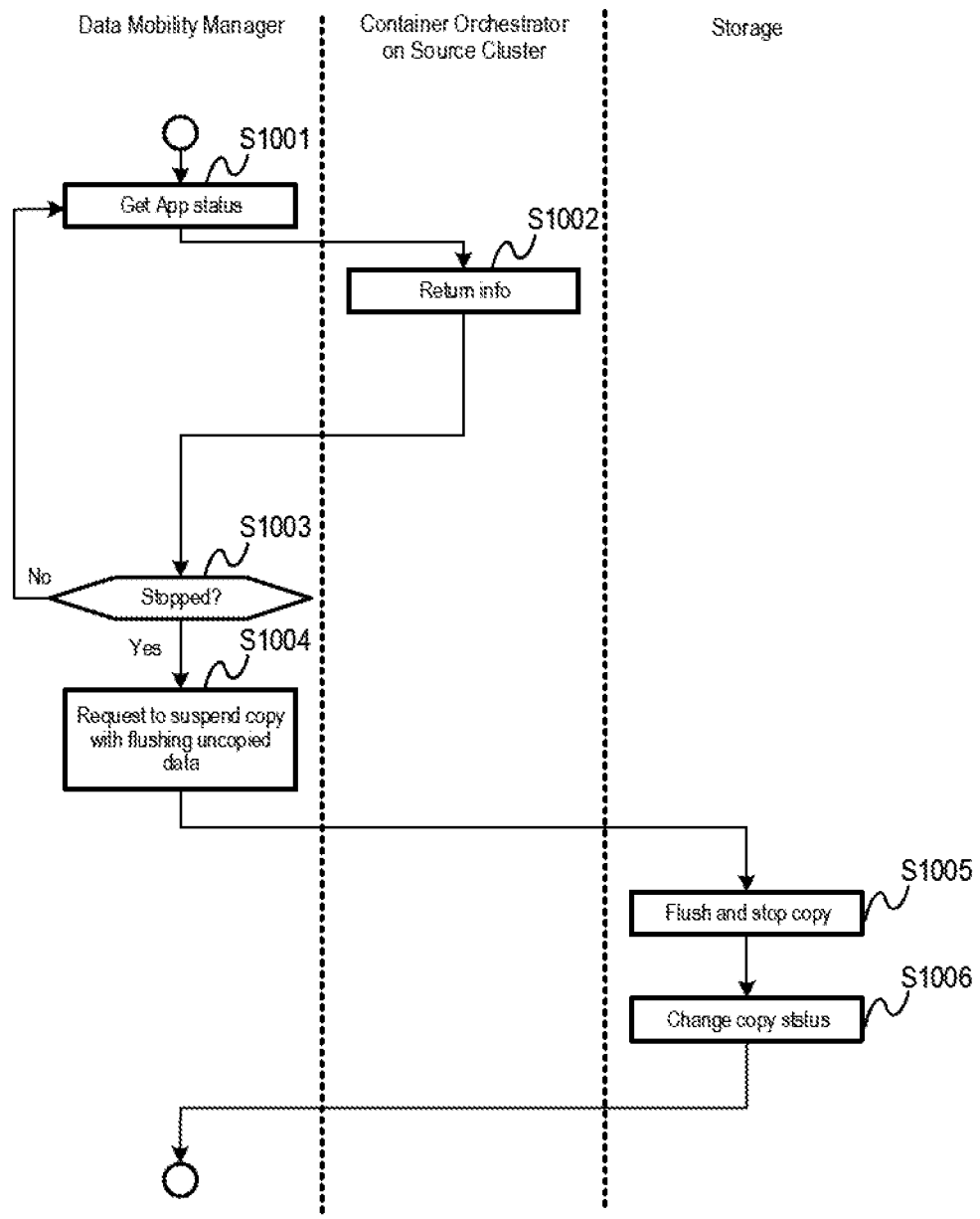
FIG. 10 illustrates an example processing flow for flushing uncopied data and stopping data copy, in accordance with an example implementation.

FIG. 10 illustrates an example processing flow for flushing uncopied data and stopping data copy, in accordance with an example implementation. Processing is performed asynchronously by the data mobility manager for application that the data mobility manager allows to be stopped. The data mobility manager stops the application after the data mobility manager allows the container orchestrator to stop the application.

First, the data mobility manager gets the application status from the container orchestrator on the source cluster at S1001. Based on the data mobility manager's request, the container orchestrator returns the application information at S1002.

According to the application information, the data mobility manager identifies whether the application has already stopped or not at S1003. In some example implementations, the identification is performed by checking the status field of the entry according to the application status in the application management table 400. If the status is "Terminated", the data mobility manager identifies that the application has already come to a stop. In some example implementations, the identification is performed by checking the existence of the entry corresponding to the application in the application management table 400. If the entry has been deleted and no longer exists, the data mobility manager also identifies that the application has been already stopped.

At S1003, a determination is made as to whether the application has come to a stop. If the answer is no, the data mobility manager goes back to S1001 and retries the process. If the application has already stopped, then the process proceeds to S1004, where the data mobility manager requests to flush uncopied data and suspend copy. According to the request, the source storage flushes all uncopied data to the copy destination volume owned by the destination storage and stops copying at S1005. Finally, the storage changes the copy status of the entry corresponding to the copy in the copy management table to "SPLIT" to indicate that copying has stopped at S1006.

Figure 11:
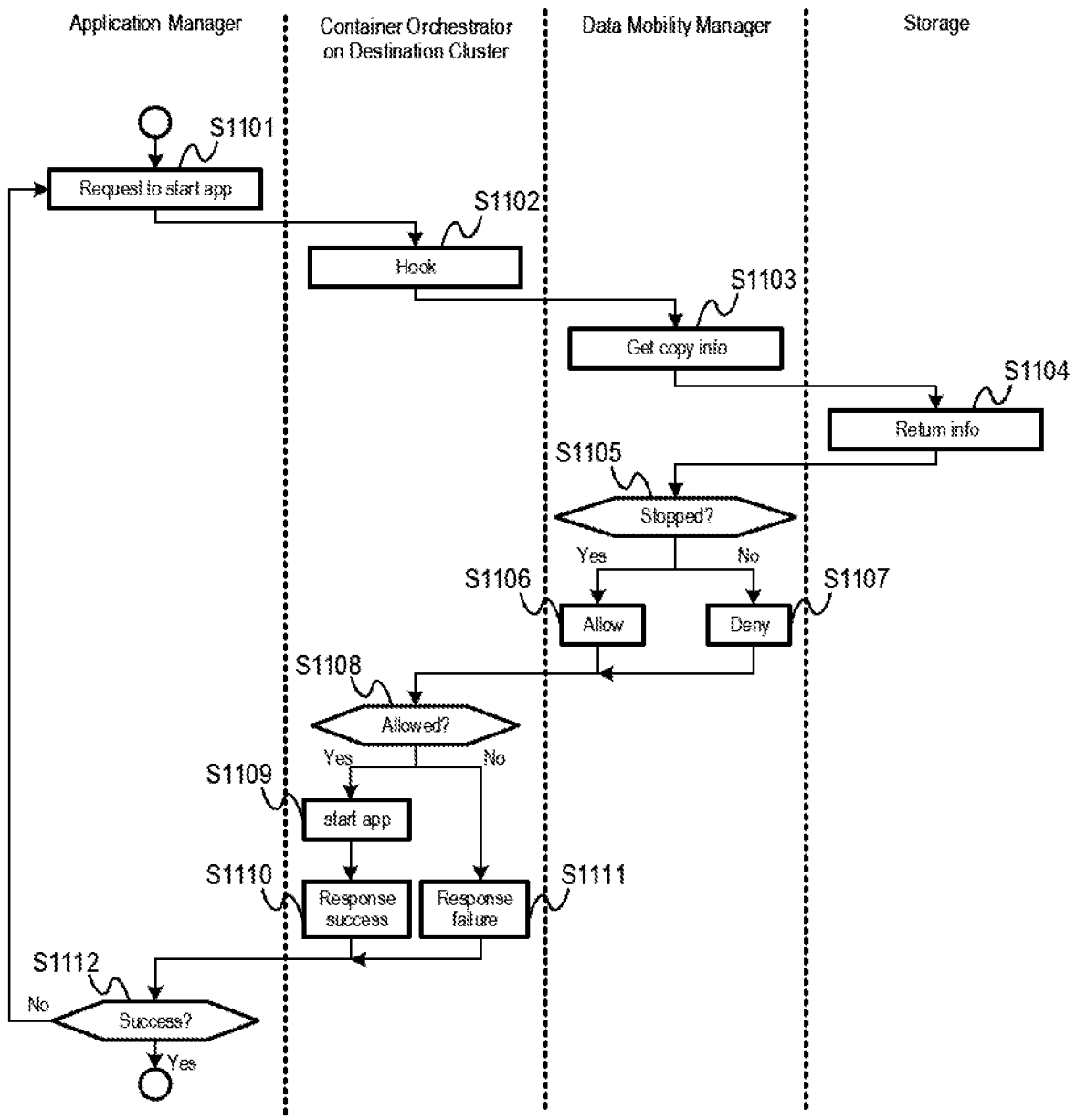
FIG. 11 illustrates an example processing flow for starting the application on the destination cluster, in accordance with an example implementation.

FIG. 11 illustrates an example processing flow for starting the application on the destination cluster, in accordance with an example implementation. First, the application manager requests the container orchestrator of the destination cluster to start the application at S1101. This request can be implemented as a request to create an entry in the application management table 400 corresponding to the application.

Next, when the container orchestrator receives the request, the data mobility manager then hooks the request at S1102. This step can be implemented with webhook technology which allows for additional process to be added dynamically.

Next, the data mobility manager gets copy information to confirm the copy status at S1103. The data mobility manager can identify the volume claim associated with the application by checking the volume claim field of the entry corresponding to the application in the application management table 400. Using the identified volume claim as key, the data mobility manager can identify the volume used by the application by searching the claim field of the volume management table. Using the storage ID and ID in storage of the identified volume as keys, the data mobility manager can identify the data copy associated with the application by searching the source and destination of the copy management table. At S1104, the storage returns the requested information to the data mobility manager.

The data mobility manager determines whether copying has been stopped or not at S1105. In some example implementations, the determination is performed by checking the copy status. If the copy status is SPLIT, the data mobility manager can identify that copying has been stopped. In some example implementations, the determination is performed by checking the existence of the entry associated with the application in the copy management table. If the entry associated with the application does not exist in the copy management table, the data mobility manager can identify that copying has been stopped.

If copying associated with the application has been stopped, the data mobility manager determines to allow the request to start the application at S1106. On the other hand, if copying associated with the application is determined as not stopped, the data mobility manager determines to deny the request to start the application at S1107.

According to the determination, if starting the application is allowed (yes at S1108), the container orchestrator of the destination cluster starts the application on the cluster at S1109 and returns the result as successful to the application manager at S1110. In the process of stopping the application, the container orchestrator selects a server from servers belonging to the cluster and starts up the containers comprising the application on the selected server. At the step of starting up containers, the volumes having copied data are attached to the containers. In addition, when the application is started, the container orchestrator creates the entry corresponding to the application in the application management table 400 of the destination cluster and changes the status to "Running." If starting the application is not allowed (no at S1108), failure is returned as the result to the application manager at S1111.

At S1112, if the result is successful, then the process is completed. On the other hand, if failure is returned as the result, then the data mobility manager returns to S1101 and retries to start the application.

Figure 13:
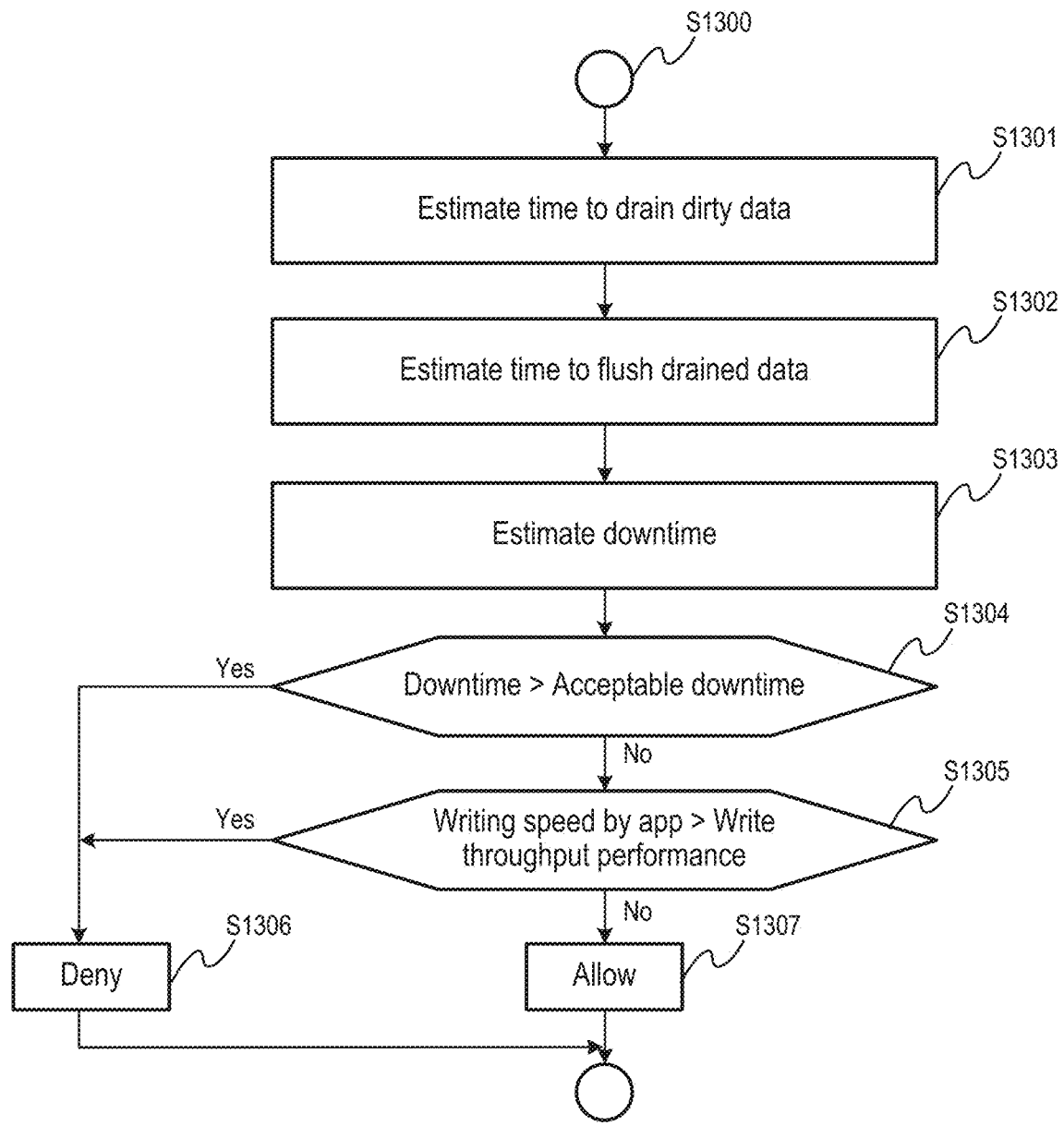
FIG. 13 illustrates an example processing flow for determining whether to perform migration based on predicted downtime, in accordance with an example implementation.

FIGS. 12 and 13 illustrate example implementations of the second embodiment. If a container retains a large amount of unwritten (dirty) data in memory, the drain time becomes longer, resulting in a longer downtime. Therefore, a second embodiment is used to prevent this problem. If the predicted downtime considering the drain time exceeds a threshold, or if the amount of data requested to be written exceeds the write performance of the storage, then the data mobility manager denies the application migration request.

FIG. 12 illustrates an example application deployment management table 1200 of the second embodiment, in accordance with an example implementation. In addition to information such as ID, repository, and placement, availability requirement is included in the application deployment management table 1200. Availability requirement is information on the requirement for application availability. A real number between 0% and 100% is specified by the user.

FIG. 13 illustrates an example processing flow for determining whether to perform migration based on predicted downtime, in accordance with an example implementation. This processing is performed by the data mobility manager after hooking the migration request at S802 of FIG. 8.

The process begins at S1301, where the data mobility manager estimates the time to drain dirty data to volumes. Draining time can be represented by:

$$\text{Time to drain} = \frac{\text{The amount of dirty data}}{\text{Throughput performance to write data to volumes}}$$

The amount of dirty data can be obtained from the operating system of the server which runs the application. Container technology is a technology that allows the resources of a server to be logically partitioned. Resource allocation is managed by the operating system and the data mobility manager can refer to the information. Out of the information on memory usage associated with the application, the data mobility manager obtains the information on the memory capacity used for having dirty data. Additionally, the throughput performance to write data to volumes can also be assessed from the operating system. In some example implementations, the bandwidth of the network equipment connecting the server and storage is used as throughput performance. In some example implementations, write performance from the server to the storage is used as throughput performance.

Next, the data mobility manager estimates the time to flush the drained data to the copy destination volume at S1302. Flush time can be represented by:

$$\text{Time to flush} = \frac{\text{The amount of dirty data}}{\text{Througput performance to copy data}}$$

The throughput performance to copy data can be obtained from the storage. In some example implementations, the bandwidth of the network device connecting the source and destination storage can be used as the throughput performance. In some other example implementations, copy performance is configured for each copy relationship. The storage can maintain this configuration information in each entry in a copy management table, and the data mobility manager can refer to it. In some other example implementations, copy performance during migration of other applications can be measured and used as throughput performance.

Next, the data mobility manager estimates downtime based on the time to drain dirty data and the time to flush the drained data at S1303. Downtime can be estimated through:

Downtime = max(time to drain, time to flush) + time to stop app + time to start app

The time to stop the application and time to start the application are obtained by monitoring these values when stopping and starting the application. Since draining and flushing data can be performed in parallel, the time of the greater of the two is added.

At S1304, the mobility manager determines if the estimated downtime is longer than an acceptable downtime. This threshold can be specified by the user as a parameter in the migration request as acceptable downtime. In some example implementations, the down time can be calculated from the availability requirement. Acceptable downtime can be represented by:

$$\text{Acceptable downtime} = \text{Duration} \times (1 - \text{Availability requirement})$$

Where duration is the length of the availability observation period.

In some other example implementations, calculation of acceptable downtime is performed by determining if any downtime has occurred during the current duration period, and subtracting the sum of the length of each downtime from the acceptable downtime calculated by the above formula. The length of each downtime is recorded and reused for this calculation. By this calculation, violation of the availability requirements can be reduced if there are downtimes due to factors other than application migration.

If the estimated downtime is longer than the acceptable downtime at S1304, the data mobility manager denies the application migration request. If the downtime is less than or equal to the acceptable downtime at S1304, the data mobility manager determines if the writing speed by the application is higher than the throughput performance to write data to volumes at S1305. The writing speed can be obtained from the operating system as the amount of data to be requested to be written per unit time from the container associated with the application.

At S1305, if the writing speed by the application is higher than the throughput performance to write data to volumes, the data mobility manager denies the application migration request at S1306. On the other hand, if the writing speed by the application is less than or equal to the throughput performance to write data to volumes, the data mobility manager allows the application migration request at S1307.

Similar to the determination by the container orchestrator at the S908 and S1108, the application manager determines whether migration is performed or not according to the data mobility manager's determination. If the data mobility manager allows the application migration, the application manager performs S803, S804, S900, S1100 and S807. If not, then the application manager does not perform S900 and S1100, and returns the result of migration as failure at S803, S804, and S807.

Figure 14:
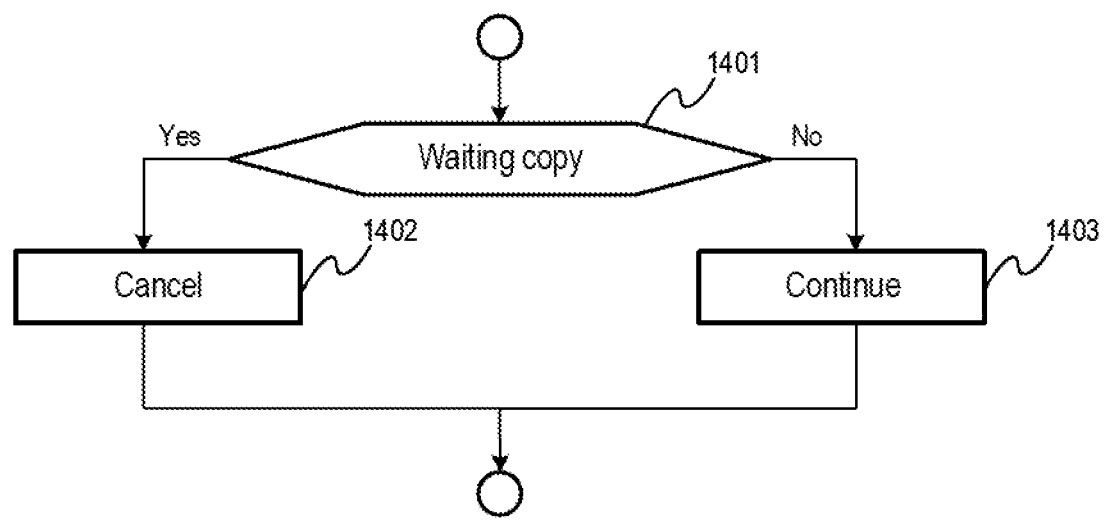
FIG. 14 illustrates an example processing flow for determining whether to cancel migration based on processing phase of migration, in accordance with an example implementation.

FIG. 14 illustrates example implementations of the third embodiment. If the migration takes longer than expected, users sometimes would like to cancel the application migration. Canceling the application migration means retaining the application on source location. However, if migration is in the phase after draining has started, then application is in the process of being stopped at the source cluster because draining is executed as part of the application stopping process. Therefore, it becomes necessary to completely stop the application in progress and restart it on the same (source) cluster. As the result, the time to stop and restart the application on the same cluster incurs downtime. This means that same downtime occurs compared with the case of completing the application migration without canceling it. On the other hand, if the application migration is in the phase before draining has been initiated, downtime can be avoided because it is performed prior to the application stopping process.

Therefore, the data mobility manager determines whether cancellation of the application migration should be performed based on the current phase of the application migration.

FIG. 14 illustrates an example processing flow for determining whether to cancel migration based on processing phase of migration, in accordance with an example implementation.

At S1401, a determination is made as to whether the application migration still in the waiting to copy phase. If the answer is yes, then the data mobility manager determines to cancel the application migration at S1402 and the application migration process is stopped. If the answer is no, then the data mobility manager continues with the application migration at S1403.

Whether or not the phase is waiting to copy can be determined by whether or not S906 has been executed. This is because, as a result of allowing the application to be stopped at S906, the application stopping process is initiated and draining of unwritten data is started.

Figure 15:
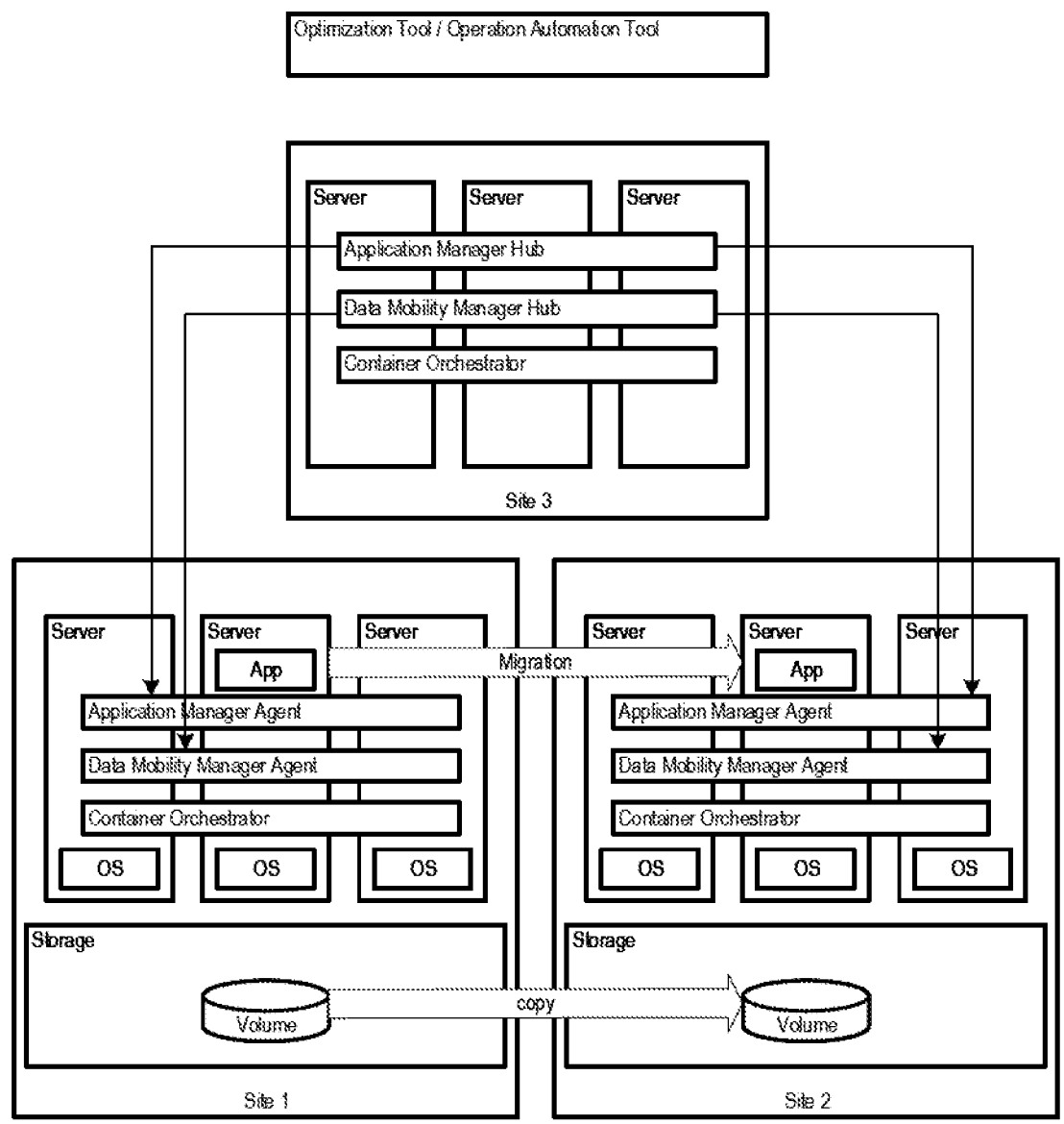
FIG. 15 illustrates an example system of the fourth embodiment, in accordance with an example implementation.

FIG. 15 illustrates an example system of the fourth embodiment, in accordance with an example implementation. In the fourth embodiment, the application manager is divided into the application manager hub and the application manager agent. The data mobility manager is divided into the data mobility manager hub and the data mobility manager agent. In the example implementations, the processing of application managers and data mobility managers can be distributed to distribute the load.

Out of processing as described in FIGS. 8, S801, S802, and S807 can be performed by the application manager hub, and S803 can be performed by the data mobility manager hub, and S804 can be performed by the data mobility agent on the source or destination cluster. The processing to stop the application as described in FIG. 9 can be performed by the application manager agent and data mobility manager agent of the source cluster. The processing to start the applications as described in FIG. 11 can be performed by the application manager agent and data mobility manager agent of the destination cluster. Furthermore, the processing to flush uncopied data and stop copying can be performed by the data mobility manager agent on the source cluster.

The foregoing example implementation may have various benefits and advantages. For example, example implementations allow critical applications requiring high availability and associated data to be migrated between clusters. Impact of data copy time on downtime is reduced which allows applications to be migrated with data between clusters while maintaining availability.

As the result, the critical applications can be included in the candidates for migration to carry out decarbonization and users can expect to achieve higher system optimization effectivity. In addition, example implementations allow the use of application migration for maintenance of systems which operate the critical applications, making it safer to maintain the systems.

Figure 16:
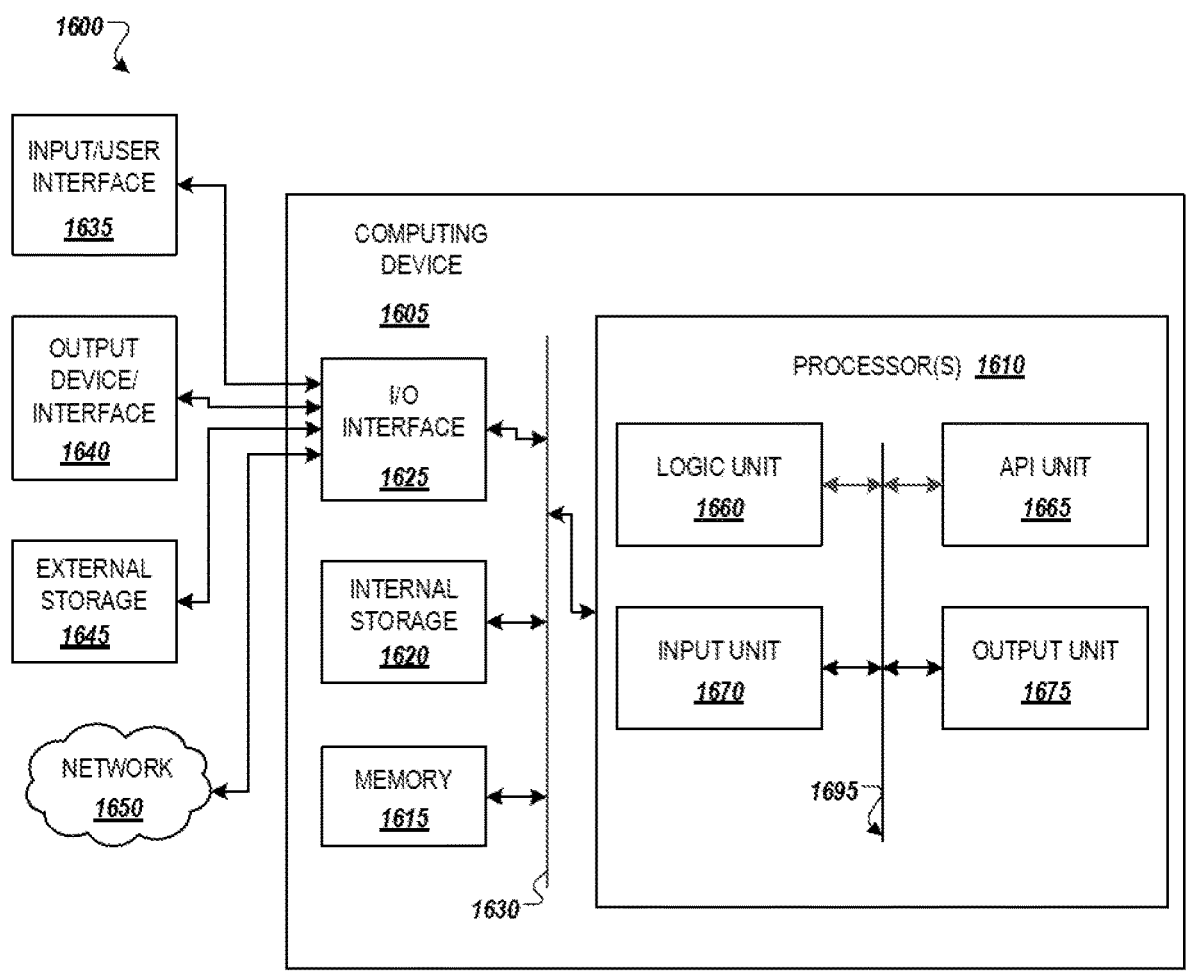
FIG. 16 illustrates an example computing environment with an example computing device suitable for use in some example implementations.

FIG. 16 illustrates an example computing environment with an example computer device suitable for use in some example implementations. Computer device 1605 in computing environment 1600 can include one or more processing units, cores, or processors 1610, memory 1615 (e.g., RAM, ROM, and/or the like), internal storage 1620 (e.g., magnetic, optical, solid-state storage, and/or organic), and/or IO interface 1625, any of which can be coupled on a communication mechanism or bus 1630 for communicating information or embedded in the computer device 1605. IO interface 1625 is also configured to receive images from cameras or provide images to projectors or displays, depending on the desired implementation.

Computer device 1605 can be communicatively coupled to input/user interface 1235 and output device/interface 1240. Either one or both of the input/user interface 1235 and output device/interface 1240 can be a wired or wireless interface and can be detachable. Input/user interface 1235 may include any device, component, sensor, or interface, physical or virtual, that can be used to provide input (e.g., buttons, touch-screen interface, keyboard, a pointing/cursor control, microphone, camera, braille, motion sensor, accelerometer, optical reader, and/or the like). Output device/interface 1240 may include a display, television, monitor, printer, speaker, braille, or the like. In some example implementations, input/user interface 1235 and output device/interface 1240 can be embedded with or physically coupled to the computer device 1605. In other example implementations, other computer devices may function as or provide the functions of input/user interface 1235 and output device/interface 1240 for a computer device 1605.

Examples of computer device 1605 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1605 can be communicatively coupled (e.g., via IO interface 1625) to external storage 1245 and network 1250 for communicating with any number of networked components, devices, and systems, including one or more computer devices of the same or different configuration. Computer device 1605 or any connected computer device can be functioning as, providing services of, or referred to as a server, client, thin server, general machine, special-purpose machine, or another label.

IO interface 1625 can include but is not limited to, wired and/or wireless interfaces using any communication or IO protocols or standards (e.g., Ethernet, 802.11x, Universal System Bus, WiMax, modem, a cellular network protocol, and the like) for communicating information to and/or from at least all the connected components, devices, and network in computing environment 1600. Network 1250 can be any network or combination of networks (e.g., the Internet, local area network, wide area network, a telephonic network, a cellular network, satellite network, and the like).

Computer device 1605 can use and/or communicate using computer-usable or computer readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 1605 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1610 can execute under any operating system (OS) (not shown), in a native or virtual environment. One or more applications can be deployed that include logic unit 1660, application programming interface (API) unit 1665, input unit 1670, output unit 1675, and inter-unit communication mechanism 1695 for the different units to communicate with each other, with the OS, and with other applications (not shown). The described units and elements can be varied in design, function, configuration, or implementation and are not limited to the descriptions provided. Processor(s) 1610 can be in the form of hardware processors such as central processing units (CPUs) or in a combination of hardware and software units.

In some example implementations, when information or an execution instruction is received by API unit 1665, it may be communicated to one or more other units (e.g., logic unit 1660, input unit 1670, output unit 1675). In some instances, logic unit 1660 may be configured to control the information flow among the units and direct the services provided by API unit 1665, the input unit 1670, the output unit 1675, in some example implementations described above. For example, the flow of one or more processes or implementations may be controlled by logic unit 1660 alone or in conjunction with API unit 1665. The input unit 1670 may be configured to obtain input for the calculations described in the example implementations, and the output unit 1675 may be configured to provide an output based on the calculations described in example implementations.

Processor(s) 1610 can be configured to detect application migration request from the first cluster to the second cluster for performing application migration as illustrated in FIGS. 1-2. The processor(s) 1610 may also be configured to identify first volumes associated with the first cluster that are used by the application as illustrated in FIGS. 1-2. The processor(s) 1610 may also be configured to establish data copying from the first volumes of a first storage device associated with the first cluster to second volumes of a second storage device associated with the second cluster as illustrated in FIGS. 1-2. The processor(s) 1610 may also be configured to determine if a copy condition is met based on the data copying as illustrated in FIGS. 1-2. The processor(s) 1610 may also be configured to, for meeting the copy condition, stop the application on the first cluster as illustrated in FIGS. 1-2. The processor(s) 1610 may also be configured to flush uncopied data from the first volumes to the second volumes as illustrated in FIGS. 1-2. The processor(s) 1610 may also be configured to determine whether the flushing of the uncopied data is completed as illustrated in FIGS. 1-2. The processor(s) 1610 may also be configured to, for the flushing of the uncopied data being completed, deploy the application on the second cluster as illustrated in FIGS. 1-2.

The processor(s) 1610 may also be configured to perform drain time prediction using remaining amount of unwritten data associated with the application from the first cluster and write throughput performance associated with the first cluster as illustrated in FIG. 13. The processor(s) 1610 may also be configured to perform flush time prediction using the remaining amount of unwritten data and copy throughput information associated with the first storage device as illustrated in FIG. 13. The processor(s) 1610 may also be configured to perform downtime prediction based on the predicted drain time and the predicted flush time as illustrated in FIG. 13. The processor(s) 1610 may also be configured to, for the predicted downtime exceeding or being identical to a time threshold, stop the application migration as illustrated in FIG. 13. The processor(s) 1610 may also be configured to, for the predicted downtime being less than the time threshold, determine if application write amount is identical to or exceeds the write throughput performance as illustrated in FIG. 13. The processor(s) 1610 may also be configured to, for the application write amount exceeding or being identical to the write throughput performance, stop the application migration as illustrated in FIG. 13. The processor(s) 1610 may also be configured to, for the application write amount being less than the write throughput performance, proceed with the application migration as illustrated in FIG. 13.

The processor(s) 1610 may also be configured to receive a request to cancel the application migration as illustrated in FIG. 14. The processor(s) 1610 may also be configured to identify a current phase of the application migration as illustrated in FIG. 14. The processor(s) 1610 may also be configured to cancel the application migration if the current phase is a waiting for copy phase as illustrated in FIG. 14. The processor(s) 1610 may also be configured to continue the application migration if the current phase is the waiting for copy phase as illustrated in FIG. 14.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer readable storage medium or a computer readable signal medium. A computer readable storage medium may involve tangible mediums such as, but not limited to optical disks, magnetic disks, read-only memories, random access memories, solid-state devices, and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for application migrating from a first cluster to a second cluster, the method comprising:
    detecting application migration request from the first cluster to the second cluster for performing application migration;
    identifying first volumes associated with the first cluster that are used by the application;
    establishing data copying from the first volumes of a first storage device associated with the first cluster to second volumes of a second storage device associated with the second cluster;
    determining if a copy condition is met based on the data copying;
    for meeting the copy condition, stopping the application on the first cluster;
    flushing uncopied data from the first volumes to the second volumes; and
    deploying the application on the second cluster,
    wherein the determining if a copy condition is met further comprises:
        performing drain time prediction using remaining amount of unwritten data associated with the application from the first cluster and write throughput performance associated with the first cluster;
        performing flush time prediction using the remaining amount of unwritten data and copy throughput information associated with the first storage device;
        performing downtime prediction based on the predicted drain time and the predicted flush time to determine a predicted downtime;
        for the predicted downtime exceeding or being identical to a time threshold, stopping the application migration;
        for the predicted downtime being less than the time threshold, determining if a transfer rate of the remaining amount of unwritten data associated with the application is identical to or exceeds the write throughput performance;
        for the transfer rate exceeding or being identical to the write throughput performance, stopping the application migration; and
        for the transfer rate being less than the write throughput performance, proceeding with the application migration,
    wherein the predicted downtime is greater of the predicted drain time or the predicted flush time.

2. The method of claim 1, wherein the determining if the copy condition is met based on the data copying comprises determining if an initial copy is completed based on the data copying, wherein the initial copy comprises a predetermine set of data.

3. The method of claim 1, wherein the determining if the copy condition is met based on the data copying comprises determining if amount of uncopied data of the first volumes is below a threshold.

4. The method of claim 1, wherein the stopping the application on the first cluster comprises:
   draining unwritten data associated with the application from the first cluster to the first storage device; and
   stopping the application on the first cluster after the unwritten data has been drained.

5. The method of claim 1, wherein the flushing the uncopied data from the first volumes to the second volumes is performed after determining the application is stopped on the first cluster.

6. The method of claim 1, wherein the deploying the application on the second cluster comprises:
   determining whether the flushing of the uncopied data is completed; and
   for the flushing of the uncopied data being completed, deploying the application on the second cluster.

7. The method of claim 1, wherein the stopping the application on the first cluster and the deploying the application on the second cluster are performed by an application manager.

8. The method of claim 1, wherein the flushing the uncopied data from the first volumes to the second volumes is initiated by a suspend copy operation.

9. The method of claim 8, wherein the flushing the uncopied data from the first volumes to the second volumes is determined as completed by change of copy state from a first state to a second state in association with the suspend copy operation, and
   wherein the first state indicates completion of an initial copy and the second state indicates the data copying is stopped.

10. The method of claim 1, further comprising:
    receiving a request to cancel the application migration;
    identifying a current phase of the application migration;
    canceling the application migration if the current phase is a waiting for copy phase where the application has been allowed to stop on the first cluster; and
    continuing the application migration if the current phase is not the waiting for copy phase.

11. A non-transitory computer readable medium, storing instructions for application migrating from a first cluster to a second cluster, the instructions comprising:
    detecting application migration request from the first cluster to the second cluster for performing application migration;
    identifying first volumes associated with the first cluster that are used by the application;
    establishing data copying from the first volumes of a first storage device associated with the first cluster to second volumes of a second storage device associated with the second cluster;
    determining if a copy condition is met based on the data copying;
    for meeting the copy condition, stopping the application on the first cluster;
    flushing uncopied data from the first volumes to the second volumes; and
    deploying the application on the second cluster,
    wherein the determining if a copy condition is met further comprises:
    performing drain time prediction using remaining amount of unwritten data associated with the application from the first cluster and write throughput performance associated with the first cluster;
    performing flush time prediction using the remaining amount of unwritten data and copy throughput information associated with the first storage device;
    performing downtime prediction based on the predicted drain time and the predicted flush time to determine a predicted downtime;
    for the predicted downtime exceeding or being identical to a time threshold, stopping the application migration;
    for the predicted downtime being less than the time threshold, determining if a transfer rate of the remaining amount of unwritten data associated with the application is identical to or exceeds the write throughput performance;
    for the transfer rate exceeding or being identical to the write throughput performance, stopping the application migration; and
    for the transfer rate being less than the write throughput performance, proceeding with the application migration,
    wherein the predicted downtime is greater of the predicted drain time or the predicted flush time.

12. The non-transitory computer readable medium of claim 11, wherein the determining if the copy condition is met based on the data copying comprises determining if an initial copy is completed based on the data copying, wherein the initial copy comprises a predetermine set of data.

13. The non-transitory computer readable medium of claim 11, wherein the determining if the copy condition is met based on the data copying comprises determining if amount of uncopied data of the first volumes is below a threshold.

14. The non-transitory computer readable medium of claim 11, wherein the stopping the application on the first cluster comprises:
    draining unwritten data associated with the application from the first cluster to the first storage device; and
    stopping the application on the first cluster after the unwritten data has been drained.

15. The non-transitory computer readable medium of claim 11, wherein the flushing the uncopied data from the first volumes to the second volumes is performed after determining the application is stopped on the first cluster.

16. The non-transitory computer readable medium of claim 11, wherein the deploying the application on the second cluster comprises:
    determining whether the flushing of the uncopied data is completed; and
    for the flushing of the uncopied data being completed, deploying the application on the second cluster.

17. The non-transitory computer readable medium of claim 11, wherein the stopping the application on the first cluster and the deploying the application on the second cluster are performed by an application manager.

18. The non-transitory computer readable medium of claim 11, wherein the flushing the uncopied data from the first volumes to the second volumes is initiated by a suspend copy operation.

19. The non-transitory computer readable medium of claim 18, wherein the flushing the uncopied data from the first volumes to the second volumes is determined as completed by change of copy state from a first state to a second state in association with the suspend copy operation, and wherein the first state indicates completion of an initial copy and the second state indicates the data copying is stopped.

20. The non-transitory computer readable medium of claim 11, further comprising: receiving a request to cancel the application migration;
identifying a current phase of the application migration;
canceling the application migration if the current phase is a waiting for copy phase where the application has been allowed to stop on the first cluster; and
continuing the application migration if the current phase is not the waiting for copy phase.

* * * * *